United States Patent
Lampinen

[11] Patent Number: 5,978,235
[45] Date of Patent: Nov. 2, 1999

[54] PRIMARY ADJUSTED SWITCHED-MODE POWER SUPPLY

[75] Inventor: Pertti Lampinen, Halikko, Finland

[73] Assignee: Nokia Technology GmbH, Pforzheim, Germany

[21] Appl. No.: 09/004,044

[22] Filed: Jan. 7, 1998

[30] Foreign Application Priority Data

Jan. 7, 1997 [FI] Finland ..................................... 970063

[51] Int. Cl.$^6$ ................................................. H02M 3/335
[52] U.S. Cl. ................................................. 363/21; 363/97
[58] Field of Search ................................. 363/21, 95, 97, 363/131

[56] References Cited

U.S. PATENT DOCUMENTS

| | | | |
|---|---|---|---|
| 4,172,276 | 10/1979 | Kameya ..................................... | 363/19 |
| 4,302,803 | 11/1981 | Shelly ....................................... | 363/20 |
| 4,488,210 | 12/1984 | Shono ....................................... | 363/19 |
| 4,704,670 | 11/1987 | Gradl et al. .............................. | 363/21 |
| 4,739,462 | 4/1988 | Farnsworth et al. ...................... | 363/21 |
| 4,975,823 | 12/1990 | Rilly et al. ............................... | 363/56 |
| 5,465,039 | 11/1995 | Narita et al. ............................. | 320/32 |
| 5,467,009 | 11/1995 | McGlinchey ............................. | 323/269 |
| 5,521,807 | 5/1996 | Chen et al. ............................... | 363/21 |
| 5,657,211 | 8/1997 | Brockmann .............................. | 363/16 |
| 5,757,625 | 5/1998 | Schoofs .................................... | 363/21 |

FOREIGN PATENT DOCUMENTS

| | | |
|---|---|---|
| 0588569 | 3/1994 | European Pat. Off. . |
| 0744818 | 11/1996 | European Pat. Off. . |
| 952571 | 5/1995 | Finland . |

OTHER PUBLICATIONS

"Switch Mode Power Supply, New Concept", T. Kieffer et al, *IEEE 1991 Int'l Conference on Consumer Electronics*, Jun. 5–7, 1991, Rosemont IL, pp. 58–59.

*Primary Examiner*—Peter S. Wong
*Assistant Examiner*—Derek J. Jardieu
*Attorney, Agent, or Firm*—Ware, Fressola, Van Der Sluys & Adolphson LLP

[57] ABSTRACT

In order to adjust the output voltage and output current of a galvanically isolated switched-mode power supply, on the primary side there is formed an auxiliary voltage (15) proportional to the secondary voltage, and said auxiliary voltage is studied by means of a window comparator, so that when the auxiliary voltage is within the reference window, there is applied fixed power adjustment, and when the auxiliary voltage falls outside the reference window (>max, <min), the quantity of electric power fed in by the isolation transformer of the primary side is restricted. Most advantageously the auxiliary voltage is formed by means of an auxiliary coil (12b) contained in the isolation transformer, and the reverse threshold voltages of two zener diodes represent the limit values of the reference window.

8 Claims, 2 Drawing Sheets

PRIMARY ADJUSTED SWITCHED-MODE POWER SUPPLY

BACKGROUND OF THE INVENTION

1. Technical Field

In general, the invention relates to the adjusting of the output features of a switched-mode power supply by means of a given control arrangement. In particular, the invention relates to a certain simple structure of the primary side of the switched-mode power supply, which structure helps to keep the secondary side voltage and current within desired limits.

2. Discussion of Related Art

Switched-mode power supplies are generally used in applications where the output voltage and output current of a device generating direct current should be controlled in an accurate and versatile manner. The principle of a switched-mode power supply is the feeding of electric power impulses to an inductive component, which has an energy-storing magnetic field. With a suitable discharge coupling, the stored energy is discharged into output voltage and output current, the values of which can be adjusted by altering the properties of the impulse supply. Electric safety often requires that there is no galvanic connection between the input and output pails of the switched-mode power supply. A common practice in this case is to use a isolation transformer, which in its simplest form consists of one primary coil and one secondary coil. The transformer divides the power supply into a primary side and a secondary side, so that the primary side connections feed electric power into the primary coil, the magnetic field of the transformer transmits the power to the secondary coil, and the secondary side connections discharge the power from the secondary coil into output voltage and output current.

The simplest adjusting method that can be used for affecting the value of the output voltage and output current of a galvanically isolated switched-mode power supply is a so-called fixed power adjustment, where the primary side always feeds the same electric power to the isolation transformer. With a sufficient accuracy it can be assumed that now also the output power of the power supply is constant. On the other hand, the output power is the product of the output current and output voltage, and therefore in a fixed power adjustment, the output voltage and output current are inversely proportional to each other, i.e. as the output voltage decreases, the output current grows, and vice versa. In more complicated adjusting systems, on the secondary side there are often provided separate measurement arrangements for the output voltage and output current, and the signal generated by these arrangements is transmitted as a response or feedback signal to the primary side through a opto-coupler or a small signal transformer.

In many applications, both the output voltage and the output current have a given allowed maximum value, so that the fixed power adjustment is not sufficient as such. By using adjusting systems that are based on measurements carried out on the secondary side, the output features of the power supply are easily restricted to fall under given maximum values, but the opto-coupler or signal transformer needed for conducting the response signal increases both the structural complexity of the power supply and the production costs. In the prior art there also are known systems where the adjusting arrangements provided on the primary side of the switched-mode power supply restrict the operation of the device, so that the output voltage and output current do not surpass the allowed maximum values. For instance, the U.S. Pat. No. 4,172,276 deals with a switched-mode power supply where the isolation transformer contains, in addition to the primary coil and secondary coil, also a third coil that generates a given auxiliary voltage to the primary side. The switching impulses of the switching transistor that keeps interrupting the primary current is adjusted by a reference voltage, generated by certain condensers and a zener diode, where the problem is particularly the dependence of the potential difference prevailing across the zener diode for the current passing therethrough. Among possible solutions, said U.S. Patent suggests the coupling of the fixed current supply in parallel to the zener diode, but the invention proper specified in the application is based on the fact that in order to generate a corrected reference voltage, into the voltage prevailing across the zener diode, there is added a compensating voltage which is formed according to the measured primary current. Thus the primary side includes a current measuring circuit. On the other hand, there also is used an additional coil for detecting the waveform of the secondary voltage and for imitating it on the primary side. The original reference voltage that feeds current through the zener diode at the switching transistor base is formed exactly by means of this additional coil.

From the Finnish patent application No. FI 952,571, there is known a system that adjusts the output voltage and output current of a switched-mode power supply in an extremely versatile and accurate manner on the basis of the operation of the primary side arrangements only. In the system of said application, an additional coil included in the isolation transformer forms an image voltage that in waveform corresponds to the secondary voltage. The image voltage is corrected by means of various correcting terms that compensate its distortions while the output features of the switched-mode power supply change. The pulse ratio of the switching pulses of the switching transistor is determined on the basis of the corrected image voltage. The switched-mode power supply according to said invention is meant to be used particularly in battery chargers, where the output current must be maintained nearly constant while the output voltage rises from a value corresponding to the terminal voltage of an empty battery to a value corresponding to the terminal voltage of a full battery, and thereafter the output voltage must remain below a given maximum value, although the fully charged battery does not receive a considerable amount of current anymore. The system according to said publication fulfils its objectives to a satisfactory degree, but is relatively complicated in structure, which increases the production costs.

SUMMARY OF INVENTION

The object of the present invention is to introduce a method for adjusting the output features of a switched-mode power supply, which method can be realised by means of a simple structural arrangement. Another object of the present invention is to introduce a switched-mode power supply where the adjusting arrangement of the output current and output voltage is a simple one. A particular object of the invention is that the method and switched-mode power supply according to it are well suited to a large-scale serial production of power supplies.

These objects of the invention are achieved by creating, by means of primary side arrangements, a reference window of the output features; within said reference window, the power supply conforms to the fixed power adjustment, and outside said window, the operation is restricted by means of the generated auxiliary voltage.

The method according to the invention is characterized in that on the primary side, there is created an auxiliary voltage proportional to the secondary voltage, and said auxiliary voltage is studied i.e. monitored by means of a window comparator, so that when the auxiliary voltage is in the reference window, there is applied a fixed power adjustment, and when the auxiliary voltage is shifted to outside the window, the quantity of electric power fed into the isolation transformer by the primary side is restricted.

The invention also relates to a switched-mode power supply characterised in that on the primary side it comprises a fixed power adjusted arrangement for feeding constant power to the isolation transformer, means for creating an auxiliary voltage proportional to the secondary voltage, and first means for reducing the constant power fed by said fixed power adjusted arrangement as a response to a given first value of the auxiliary voltage.

According to the invention, the switched-mode power supply is allowed to function in the fixed power adjustment mode as long as the output voltage generated by the secondary side on one hand does not rise too high, and on the other does not drop too low. In order to estimate the output voltage, on the primary side there is formed an auxiliary voltage proportional to the secondary voltage, and the value of said auxiliary voltage controls the creation of the switching pulses of the switching transistor. When the value of the auxiliary voltage is within the so-called reference window, i.e. between the values describing the allowed maximum values of the output features, the power supply functions in the fixed power adjustment mode. When the auxiliary voltage surpasses the value corresponding to the highest allowed output voltage, it switches on a certain limiter arrangement that reduces the switching pulses of the switching transistor. Respectively, if the auxiliary voltage decreases below the minimum value, this means that the output current tends to grow over the allowed value, in which case the limiter arrangement reacting to a low value of the auxiliary voltage again decreases the switching pulses of the switching transistor.

The limiter arrangements are easily realized for instance by means of two zener diodes, of which the first has a higher reverse threshold voltage than the second, in which case staying in the reference window means that the auxiliary voltage value stays somewhere between the reverse threshold voltages of the zener diodes. In this switching system, the zener diodes are arranged so that if the absolute value of the auxiliary voltage surpasses the reverse threshold voltage of the first zener diode, or drops below the reverse threshold voltage of the second zener diode, the electric current proceeding through said zener diode in the reverse direction reduces the quantity of electric energy in that part of the circuit that generates the switching pulses of the switching transistor.

BRIEF DESCRIPTION OF THE DRAWING

The invention is explained in more detail below, with reference to a preferred embodiment presented by way of example, and to the appended drawings, where.

DETAILED DESCRIPTION OF PREFERRED EMBODIMENTS

Figure 1:
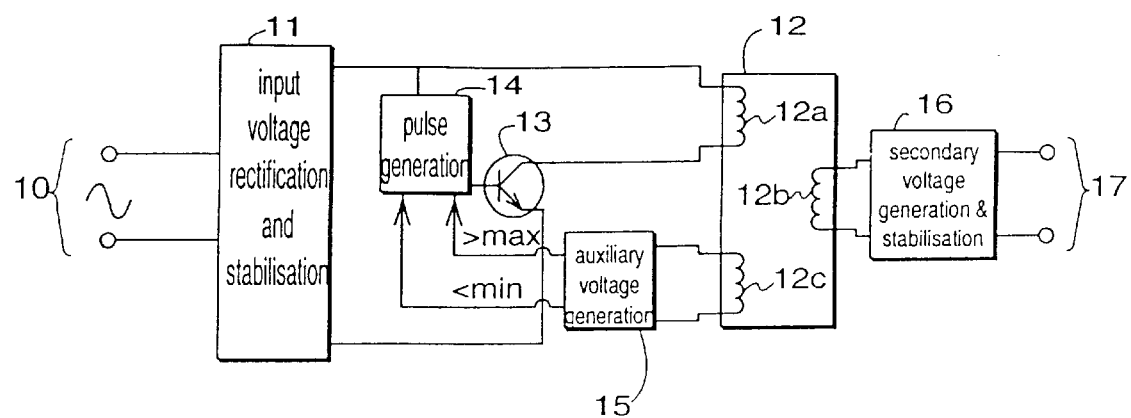
FIG. 1 illustrates the principle of the invention.

FIG. 1 is a drawing in principle of a galvanically isolated switched-mode power supply that includes a circuit arrangement according to the invention for adjusting the output voltage and output current. Via the input voltage coupling 10, the switched-mode power supply is connected to an alternating voltage that can be for instance the voltage of the regular electric power supply system (in Finland 230 V, 50 Hz). The block 11 rectifies and stabilizes the output voltage and prevents the interference created by the power supply from proceeding to the alternating voltage network. The primary coil 12a of the isolation transformer 12 and the switching transistor 13 together form a serial circuit connected to the rectified output voltage, where the switching transistor 13 keeps interrupting the current passing via the primary coil 12a according to the types of switching pulses its base receives from the pulse formation block 14. Pulse formation is partly controlled by an auxiliary voltage formation block 15, which forms the auxiliary voltage by means of the additional coil 12c provided in the transformer 12. From the auxiliary voltage formation block 15, there are in this case provided two signal lines to the pulse formation block 14, of which the first signal line (>max) transmits the information that the auxiliary voltage is higher than a given value corresponding to the maximum value of the output voltage, and the second signal line (<min) transmits the information that the auxiliary voltage is lower than a given value corresponding to the minimum value of the output voltage. In the secondary coil 12b of the transformer 12, there is connected a secondary voltage formation and stabilization block 16, on the other side of which there is provided an output voltage connection 17. The output voltage of the switched-mode power supply is the voltage prevailing between the terminals of the connection 17, and the output current is the current passing between said terminals.

The switched-mode power supply according to FIG. 1 is operated as follows. The pulse formation block 14 forms switching pulses that switch the switching transistor 13 alternatingly to conductive and non-conductive state. Due to the voltage created by the block 11, current flows in the primary coil 12a when the transistor 13 is in conductive state. A change in the current stores energy in the magnetic field of the transformer 12. When the transistor 13 stops from being conductive, the energy stored in the magnetic field is discharged, mainly through the secondary coil 12b, to the formation and stabilization block 16 of the secondary voltage. A small share of the energy also is discharged through the additional coil 12c to the auxiliary voltage formation block 15. The magnetic coupling between the separate coils of the transformer 12 is fixed and does not depend on the current and voltage values, and therefore the auxiliary voltage value is proportional to the secondary voltage value and therethrough to the output voltage value.

In normal conditions, the secondary voltage formation and stabilization block 16 feeds, through the output voltage connection 17, a given amount of electric power to the load (not illustrated in the drawing), in which case the switched-mode power supply of FIG. 1 functions as fixed power adjusted, i.e. the electric power fed into the transformer 12 by the primary side is essentially constant. If the output current decreases, for instance when a battery that is being charged and is connected to the output voltage connection 17 becomes fully charged, the output voltage tends to rise. According to the above description, this also is seen as an increase in the absolute value of the auxiliary voltage in the block 15. When the absolute value of the auxiliary voltage surpasses a given first threshold value, the block 15 transmits, via the line >max, information to that effect to the pulse formation block 14, which reacts by reducing the pulse ratio, i.e. the relative share of the switching pulses of the switching cycle period. Respectively, if the output current grows during the fixed power adjustment, the output voltage drops, which is seen as a decrease of the absolute value of the auxiliary voltage in the block 15. When the absolute value of the auxiliary voltage drops below a given second threshold value, the block 15 transmits, via the line >min, information to that effect to the pulse formation block 14, which again reacts by reducing the pulse ratio.

Among the functional blocks illustrated in FIG. 1, the present invention is mainly related to blocks 14 and 15. The functions according to blocks 11 and 16 are known in the prior art. Like in analog electronics in general, the functional blocks need not in practice be clearly separate structural elements, but they can be interlaced in many ways. The auxiliary coil, for instance, can also function as a part of the pulse formation block 14.

Figure 2:
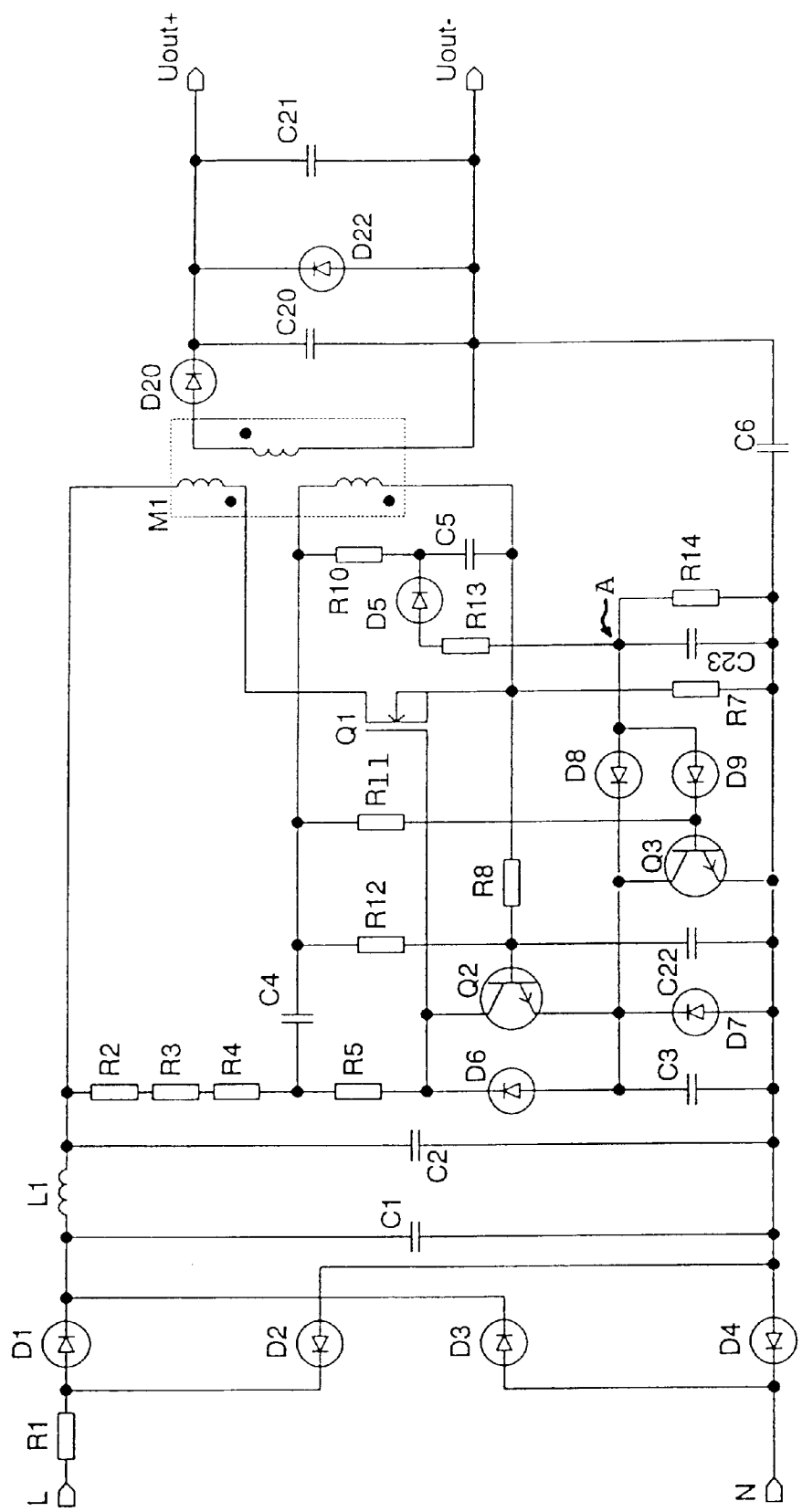
FIG. 2 is a circuit diagram of a switched-mode power supply according to a preferred embodiment of the invention.

FIG. 2 is a circuit diagram of a switched-mode power supply illustrating a preferred embodiment of the invention in more detail. The terminals of the input voltage connection are marked with letters L and N. The resistor R1, the diodes D1, D2, D3 and D4, the coil L1 and the condensers C1 and C2 rectify and stabilize the output voltage, in similar fashion as the block 11 in FIG. 1. The isolation transformer is marked with M1 and the MOSFET type switching transistor with Q1. The proceeding route of the primary current comprises, between the terminals of the rectified input voltage, the serially coupled primary coil of the transformer M1, the switching transistor Q1 and the resistor R7. The switching pulses of the switching transistor are formed in an oscillator circuit, which is composed of a resistor chain R2–R3–R4, of resistors R5, R8, R11 and R12, a zener diode D6, a transistor Q2, a diode D7 as well as of C3, C4, C5 and C22. Said resistor chain is connected to a point between the positive terminal of the rectified input voltage and the spot between the resistor R5 and the condenser C4, and from said point, there is provided a connection, via the resistor R5, to the collector of the transistor Q2 and to the gate of the switching transistor Q1, as well as a connection via the condenser C4 to the first terminal of the auxiliary coil. From the point between the condenser C4 and the auxiliary coil, there is provided a connection, via the resistor R12, to the base of the transistor Q2, which in turn is connected via the resistor R8 to both the source of the switching transistor Q1 and to the second terminal of the auxiliary coil. The condenser C5 and the resistor R10 form a serial coupling in between the terminals of the auxiliary coil. The condensator C3 and the diode D7 are coupled in parallel in between the emitter of the transistor Q2 and the negative terminal of the rectified input voltage (the cathode of the diode D7 is connected to the emitter of the transistor Q2). The condenser C22 is connected in between the base of the transistor Q2 and the negative terminal of the rectified input voltage. The zener diode D6 is connected in the reverse direction in between the collector and the emitter of the NPN type transistor Q2.

In order to form the auxiliary voltage, the circuit contains resistors R10, R13 and R14, a condenser C23, an NPN transistor Q3, a diode D5 and zener diodes D8 and D9. The cathode of the diode D5 is connected to a point between the resistor R10 and the condenser C5, and its anode is connected, via the resistor R13, to the point A, the potential of which is very important in relation to the auxiliary voltage. Between this point and the negative terminal of the rectified input voltage, there are parallelly coupled condenser C23 and the resistor R14. To said point A, there also are connected the anodes of both zener diodes D8 and D9.

Among these, the cathode of the zener diode D8 is in connection with the emitter of the transistor Q2 and to the collector of the transistor Q3, and the cathode of the zener diode D9 is in connection with the base of the transistor Q3 and, via the resistor R11, to the first terminal of the auxiliary coil.

On the secondary side the secondary coil of the transformer M1, the diode D20 and the condenser C20 together form the basic coupling for the secondary side of a flyback type switched-mode power supply. The zener diode D22 and the condenser C21 are connected in parallel in between the terminals of the condenser C20 in order to restrict the output current, when the load is switched off. The output voltage terminals are directly the same as the secondary voltage terminals, i.e. the terminals of the secondary condenser C20.

Next we shall explain the operation of a circuit according to FIG. 2. The operation of the rectifying and stabilization elements of the output voltage is well known, and we shall not discuss it here. When power is switched to the device, the current flowing through the resistor chain R2–R3–R4 charges the condensator C4 full, so that the gate potential of the switching transistor Q1 rises to a positive value, and the switching transistor becomes conductive. Via the primary coil of the transformer M1, via the switching transistor Q1 and the resistor R7, there begins to flow a growing electric current that stores energy in the magnetic field of the transformer. At the same time, the potential of the point in between the switching transistor Q1 and the resistor R7 begins to rise, and the condenser C22 begins to be charged, which increases the base-emitter-voltage of the transistor Q2. When the base-emitter-voltage of the transistor Q2 has risen sufficiently high, the transistor Q2 becomes conductive and discharges the charge that prevailed in the switching transistor gate through the diode D7. The discharging is speeded up by the charging of the condenser C3. The switching transistor stops being conductive, whereupon the transistor Q2 also stops being conductive, and the energy stored in the magnetic field of the transformer M1 is discharged, for the major part to the secondary side. However, part of the energy is discharged through the auxiliary coil, thus inducting thereto a current that has a reverse direction in comparison to the low current that was inducted to the auxiliary coil owing to the effect of the primary coil current. The loop formed by the auxiliary coil, the condenser C5 and the resistor R10 serves as an attenuation circuit, the task of which is to attenuate the voltage peak caused by the discharging of the energy charged to the stray inductance of the transformer M1. When all energy charged in the transformer M1 is discharged, the operation cycle again begins at the beginning.

The diode D5 serves as a rectifier that forms at the point A a negative potential levelled by the condenser C23, and the absolute value of this negative potential is proportional to the secondary voltage. The zener diodes D8 and D9 adjust the operation of the primary side under the control of said potential. The reverse threshold voltage of the zener diode D8 is the higher of these two. Let us first assume that the secondary current is extremely low, in which case the secondary voltage tends to rise according to the principles of the fixed power adjustment. Because the absolute value of the negative voltage rectified from the auxiliary coil by means of the diode D5 is proportional to the secondary voltage, the potential of the point A is always the more negative, the higher the secondary voltage. When the reverse voltage prevailing across the zener diode D8 grows higher than the reverse threshold voltage of said zener diode, the zener diode begins to be conductive in the reverse direction, which pulls the emitter of the transistor Q2 towards the more negative direction. In such a situation, even a slight current inducted by the primary current in the current loop formed by the auxiliary coil and the resistors R8 and R12 suffices to make the transistor Q2 conductive, in which case the conductive periods of the switching transistor Q1 remain very short, and the amount of energy fed by the primary side to the isolation transformer is reduced. If the secondary current begins to increase, the secondary voltage decreases, which is seen on the primary side as a reduction of the absolute value of the potential of the point A. When the zener diode D8 is no more conductive in the reverse direction, the power supply functions again according to the regular fixed power adjustment principle.

Let us next assume that the secondary current continues to grow, in which case the secondary voltage and the potential absolute value of the point A that is proportional thereto both decrease. As long as the point A is sufficiently negative in order to keep the zener diode D9 conductive in the reverse direction, the potential of the base of the transistor Q3 remains low, and the transistor Q3 is not conductive. If the reverse voltage prevailing over the zener diode D9 drops below the reverse threshold voltage of the zener diode D9, it stops from being conductive in the reverse direction, and the base of the transistor Q3 receives, via the resistor R11, a given positive voltage, so that the transistor Q3 is set to saturation mode, thus forming a new current path between the emitter of the transistor Q2 and the negative terminal of the rectified input voltage. With low currents, the collector-emitter voltage of a typical NPN transistor in the saturation mode is only about 50 mV, i.e. fairly low in comparison with the forward voltage of roughly 0.6 V that prevails across the diode D7. This increases the discharging of the gate charge of the switching transistor Q1, taking place in each operation cycle, which reduces the quantity of electric power to be fed into the isolation transformer.

Figure 3:
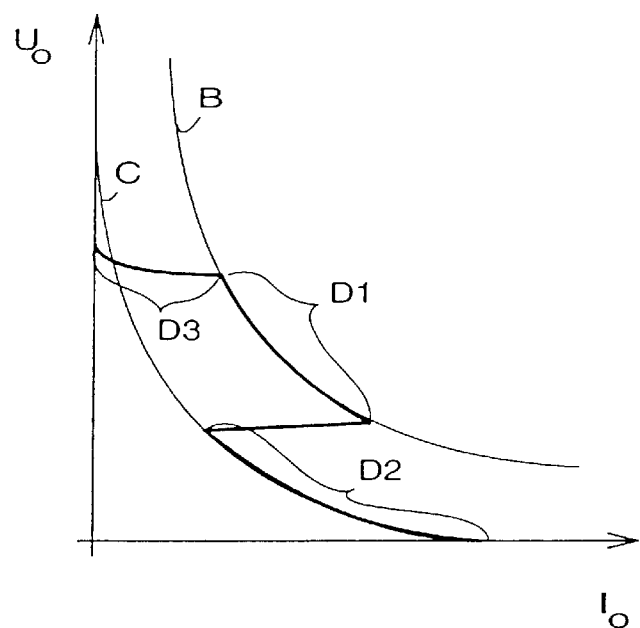
FIG. 3 illustrates the output current—output voltage graph of a switched-mode power supply according to FIGS. 1 or 2.

FIG. 3 is a current—voltage graph where the horizontal axis represents the output current of the switched-mode power supply, and the vertical axis represents the output voltage of the switched-mode power supply. The scales on the axes are only rough guidelines and of no importance for this specification. The curve B describes generally the output voltage as a function of the output current, when fixed power adjustment is applied in the switched-mode power supply. From the 1/x type form of the curve it is seen that the product of the output current and the output voltage at each point of the curve is constant. The curve C generally describes the output voltage as a function of the output current, when fixed power adjustment is applied in the switched-mode power supply, and the fixed power adjustment is set lower than in the case of the curve B. The thick line D represents the functional curve of the switched-mode power supply according to FIGS. 1 and/or 2. The part D1 corresponds to the fixed power adjustment in so-called normal conditions, i.e. when the output voltage and output current remain somewhere between the allowed maximum values. In the embodiment illustrated in FIG. 2, the part D1 of the line D represents a situation where the reverse voltage prevailing across the zener diode D8 is lower than the reverse threshold voltage of said zener diode, but the reverse voltage prevailing across the zener diode D9 is higher than the reverse threshold voltage of said zener diode. The discharging of the gate charge of the switching transistor Q1 in each operation cycle, which is essential for the fixed power adjustment, is now carried out through the transistor Q2 and the diode D7. In the embodiment of FIG. 2, the part D2 of the curve D represents a situation where the output current is restricted and the reverse voltage prevailing across both zener diodes D8 and D9 is lower than the reverse threshold voltage of either of the diodes. Now the discharging of the gate charge of the switching transistor Q1 in each operation cycle is carried out through the transistors Q2 and Q3. In the embodiment of FIG. 2, the part D3 of the curve D represents a situation where the output voltage is restricted and the absolute value of the negative potential of the point A is so high that both zener diodes D8 and D9 are conductive in the reverse direction, which in turn pulls the emitter of the transistor Q2 towards the negative direction a manner described above.

In addition to the above described features, the switched-mode power supply illustrated in FIG. 2 includes an automatic compensation against fluctuations of the input voltage. This device is designed to function at least with the values from 95 to 264 volts of the AC input voltage, which, when rectified and stabilized, means a voltage range between roughly 70 and 370 volts. The energy E that is charged during one operation cycle to the magnetic field of the transformer with an inductance value L follows in a known fashion the following formula:

$$E = \frac{I^2 \cdot L}{2},$$

where the speed of the rise of the current I, while the switching transistor is conductive, is directly proportional to the value of the rectified input voltage. On the other hand the power P, which is fed in the transformer by the primary side, is the product of the energy E charged in one operation cycle and of the operation voltage f, i.e.

$$P = E \cdot f$$

If we assume that the voltage of the load (for example a battery that is being charged) connected to the switched-mode power supply remains constant, the current that it takes from the secondary side is discharged in a fixed period and hence does not affect the switching voltage f. If the input voltage grows, the switching voltage f and the power P fed into the transformer by the primary side tend to increase. In the switched-mode power supply according to FIG. 2, the resistor R12 creates, by means of an auxiliary coil, a positive voltage that rises the potential with respect the transistor Q2 the more positive, the higher is the input voltage of the switched-mode power supply, in which case the transistor Q2 becomes more sensitively conducting, which in turn restricts the quantity of the power fed into the transformer M1 by the primary side and thus compensates the influence of the growing input voltage. A similar compensation could also be realised by connecting the voltage, instead of R12, directly in between the rectified input voltage and the base of the transistor Q2, but in that case said resistor would result in a larger power loss than the arrangement of FIG. 2.

The switched-mode power supply according to the invention is very simple in structure, and the restricting of the output voltage and output current is realized with an accuracy that suffices for most regular targets of application. For a man skilled in the art it will be evident that the detailed embodiments described above are presented by way of example: the circuit topology can be altered without deviating the operation of the circuit from the scope of the invention defined in the appended claims.

I claim:

1. A method for adjusting the output voltage and output current of a switched-mode power supply that is galvanically isolated by means of an isolation transformer, comprising the steps of:

provilding a quantity of power to said isolation transformer, on a primary side, providing an auxiliary voltage proportional to a secondary voltage, monitoring said auxiliary voltage by means of a window comparator, for restricting the quantity of electric power fed into the isolation transformer by the primary side when the auxiliary voltage falls outside a reference window, and otherwise providing the quantity of electric power as a fixed quantity.

2. A method according to claim 1, further comprising the step of monitoring said auxiliary voltage by means of an auxiliary coil, which forms part of said isolation transformer.

3. A switched-mode power supply comprising a primary side for feeding electric power to an isolation transformer, and a secondary side for forming a secondary voltage of the electric power transmitted by the isolation transformer, said primary and secondary sides being separated by means of the isolation transformer, characterized in that on the primary side, the switched mode power supply comprises means for feeding constant power to the isolation transformer, means for forming an auxiliary voltage proportional to the secondary voltage, and means for providing a first signal for reducing the constant power fed by said fixed power adjusted arrangement as a response to a given first value of the auxiliary voltage.

4. The switched-mode power supply of claim 3, further characterized by a switching transistor for interrupting a primary current, and a second transistor for ending a switching pulse of said switching transistor by switching a control electrode of the switching transistor to a lower potential, and wherein said first signal for reducing the constant power fed by the means for feeding constant power is provided by a first switching component for changing said lower potential in a negative direction.

5. The switched-mode power supply of claim 4, characterized in that said switching component is a zener diode, a reverse threshold voltage of which represents the given first value of the auxiliary voltage.

6. The switched-mode power supply of claim 3, characterized in that said means for providing a first signal is also for providing a second signal for reducing the constant power fed by the fixed power adjusted arrangement as a response to a given second value of the auxiliary voltage, said second value representing a lower value of the secondary voltage than said first value.

7. The switched-mode power supply of claim 6, characterized in that it includes a switching transistor for interrupting a primary current and a second transistor for ending a switching pulse of said switching transistor by switching a control electrode of the switching transistor a lower potential via a given first current path, and wherein said second signal for reducing the constant power fed by the means for feeding constant power is provided by a second switching component for forming a second current path in parallel to said first current path.

8. A switched-mode power supply according to claim 7, characterized in that said switching component is a zener diode, a reverse threshold voltage of which represents said second value of the auxiliary voltage.

* * * * *

UNITED STATES PATENT AND TRADEMARK OFFICE
CERTIFICATE OF CORRECTION

PATENT NO : 5,978,235
DATED : November 2, 1999
INVENTOR(S): P. Lampinen

It is certified that error appears in the above-identified patent and that said Letters Patent is hereby corrected as shown below:

At col. 10, line 21 (claim 7, line 5), please insert
    --to-- after "transistor".

Signed and Sealed this

Fourth Day of July, 2000

*Attest:*

Q. TODD DICKINSON

*Attesting Officer*     *Director of Patents and Trademarks*